3,150,188
AROMATIC PHOSPHITE CATALYST MODIFIERS
IN THE OXO PROCESS
John L. Eisenmann, Braintree, and Raymond L. Yamartino, Wayland, Mass., assignors, by mesne assignments, to Diamond Alkali Company, Cleveland, Ohio, a corporation of Delaware
No Drawing. Filed Apr. 21, 1960, Ser. No. 23,620
5 Claims. (Cl. 260—598)

This invention relates to the production of aldehydes by the addition of carbon monoxide and hydrogen to olefins in the presence of a catalyst. More particularly, this invention relates to the improvement in the catalyst in order to produce aldehydes in the hydroformylation of olefins to the essential exclusion of other normal reaction products such as alcohols, etc. A more specific aspect of this invention relates to the modification of the usual catalysts for such reaction by the addition thereto of compounds which effect the result of the production of aldehydes to the substantial exclusion of alcohols, etc.

The hydroformylation of olefins by the addition thereto of carbon monoxide and hydrogen is also referred to as the "oxo reaction." The reaction that takes place is that a hydrogen atom and a formyl group add onto the double bond of the olefin in the presence of a catalyst. One of the most effective types of catalysts for such a reaction has been known to be salts of cobalt, and in particular dicobalt octacarbonyl [$Co_2(CO)_8$] has been found most effective (U.S. Pat. No. 2,820,059). Such catalysts could be applied in the solid form or in the liquid phase, suspended, as for example in an inert liquid medium such as benzene, etc.

The formation of aldehydes according to the prior art by the "oxo reaction" may be represented, in a specific embodiment, by the following overall equations:

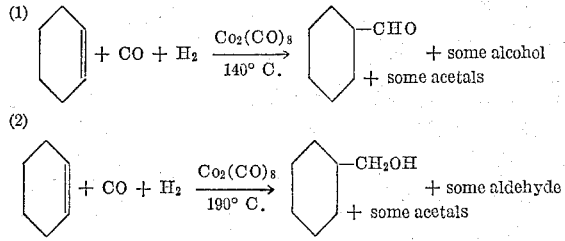

Thus it is seen that the hydroformylation of cyclohexene at approximately 140° C. results in the formation of the aldehyde as the major product with some minor portion of the alcohol therewith. On the other hand, when the same reaction is effected at approximately 190° C., the alcohol is the major product with some minor proportion of the aldehyde mixed therewith. It is thus seen that the catalysts [$Co_2(CO)_8$] alone is reasonably effective at a comparative low temperature for production of aldehydes, but at comparative high temperatures the alcohols are the major products of the reaction.

It has been discovered in accordance with the present invention that if an aromatic phosphite, for example, triphenylphosphite is added as a catalyst modifier, whether at high or low temperatures, the aldehyde is formed exclusively with substantially on trace of alcohol present. Such aldehydes find wide use such as flavorings, as drug intermediates, etc.

An object of this invention is to provide improved catalysts for the hydroformylation of olefins to produce aldehydes. A further object of this invention is to provide a method for producing aldehydes, exclusively, from olefinic compounds, carbon monoxide, and hydrogen in the presence of a catalyst therefor and a modifier for said catalyst which functions for the stated purpose. A further object of this invention is to effect a higher rate of hydroformylation reaction and especially at higher temperatures than heretofore possible for the production of aldehydes. Still another object is to provide a process for the production of aldehydes by the hydroformylation reaction of an olefin compound, carbon monoxide, and hydrogen in the presence of an effective catalyst therefor without the necessity of precise control of temperature in order to obtain the aldehyde. Another object is to provide a method of producing high yields of substantially pure aldehydes by the hydroformylation reaction of olefins, carbon monoxide and hydrogen. Other objects will readily appear from the following detailed disclosure of the present invention.

It has been discovered in accordance with the present invention that the above objects are accomplished by the addition of an aromatic phosphite compound to the hydroformylation system comprising a solution of cobalt carbonyl in an inert solvent. Unexpectedly the presence of, for example, triphenylphosphite as a modifier with the catalyst dicobalt octacarbonyl enhances the cobalt hydroformylation catalyst to the end that aldehydes exclusively are formed without the presence of the usual alcohols without precise temperature control and at a much faster rate than would otherwise occur. If, for example, triphenylphosphite is added as a catalyst modifier in the reaction of number (2) above, even at 190° C., a predominant yield of aldehyde is obtained and not the otherwise expected alcohol.

The reaction between the olefinic compound, carbon monoxide, and hydrogen in the presence of the dicobalt octacarbonyl modified with the aromatic phosphite compound is generally conducted at temperatures in the range of about 110° to 350° C., and preferably between about 160° C. and 225° C. The process may be carried out at ordinary or superatmospheric pressures and preferably at superatmospheric pressures in excess of 200 and up to 500 atmospheres, in which case the reaction product is predominantly an aldehyde.

The relative proportions of reactants may be stoichiometrical but other molar ratios may be employed such as when the olefin:CO:$H_2$ ratio is within the range of about 1:1:1 to about 1:5:10. Excess hydrogen is not always necessary.

The amount of catalyst is generally within the range of about .05 to 10 percent based on the weight of the reaction mixture and the ratio of catalyst [$Co_2(CO)_8$] to aromatic phosphite (triphenylphosphite) may preferably show a molar excess of aromatic phosphite over the carbonyl catalyst such as 1:2 to 1:10 and preferably about 1 mole carbonyl to about 4 moles aromatic phosphite.

The inert solvent used as the reaction media in the process of this invention is such as to be inert with respect to the catalyst as well as the hydroformylation products. Among such solvents are, or example, the aromatic hydrocarbons such as benzene, xylene, toluene, and their derivatives, saturated aliphatic hydrocarbons such as pentanes, naphtha, kerosene, mineral oils, etc.; saturated alicyclic hydrocarbons such as cyclohexane, cyclopentane, etc., as well as the ethers, esters, ether-esters, etc., may also be used.

The catalyst modifier is found to be of the class of aromatic phosphite compounds such as triphenylphosphite, bis-(p-tolyl)-phenyl-phosphite, diphenyl phosphites, etc. or coordination compounds of aromatic phosphites, such as bis-(triphenylphosphite) chromium tetracarbonyl, trinaphthyl phosphite and nuclear substituted derivatives thereof.

The hydroformylation reaction has been applied to olefinic compounds which include, for example, hydrocarbons, alcohols, esters, ethers, etc. The prior art amply discloses the classes and individual olefinic compounds susceptible to hydroformylation.

The following table effectively illustrates the hydroformylation of the olefin cyclohexene with dicobalt octacarbonyl as the catalyst with various catalyst modifiers including the modifier of the present invention:

TABLE 1

[0.5 mole cyclohexene in 300 ml. benzene 1:1 synthesis gas at 3600 p.s.i.]

| Catalyst | | Time, hr. | T° | Yields | | | Total hydroformylation, percent |
|---|---|---|---|---|---|---|---|
| $Co_2(CO)_8$ | Modifier | | | C$_6$H$_{11}$—CHO | C$_6$H$_{11}$—CH$_2$OH | Unidentified, g. | |
| 2.0 g. (.0059 mole) | None | 2 | 190 | 1.0%; 0.5 g. | 50.5%; 28.8 g. | 11.3 | 51.5 |
| Do | 2.1 g. (.026 mole) pyridine | 2 | 190 | 4.7%; 2.6 g. | 70.2%; 40.0 g. | 10.0 | 74.9 |
| Do | 6.8 g. (.026 mole) triphenylphosphine | 2 | 190 | 7.1%; 3.9 g. | 36.3%; 20.7 g. | 5.3 | 43.4 |
| Do | 2.2 g. (.026 mole) piperidine | 2 | 190 | 1.5%; 0.8 g. | 56.3%; 32 g. | 5.2 | 57.8 |
| Do | 4.3 g. (.026 mole) triethylphosphite | 2 | 190 | 1.4%; 0.8 g. | 40.5%; 23.1 g. | 13.7 | 41.9 |
| Do | 7.9 g. (.026 mole) triphenylphosphite | 2 | 190 | 67%; 37.3 g. | 6.7%; 3.8 g. | 3.8 | 73.7 |
| Do | do | 2 | 140 | 52.7%; 29.5 g. | | 0 | 52.7 |
| Do | 6.1 g. (.026 mole) diphenylphosphite | 2 | 190 | 42.4%; 23.7 g. | 0.1%; 0.1 g. | .6 | 42.5 |

From the above table it is seen that the aromatic phosphite, triphenylphosphite, when added to the catalyst [Co$_2$(CO)$_8$] at both temperatures of 190° C. and 140° C. effectively hydroformylated with high yields the olefin cyclohexene to the aldehyde with only a minor quantity of alcohol formation at 190° C. and not a trace of alcohol when the reaction was carried out at 140° C. The example of diphenylphosphite acted in similar manner. It is also demonstrated in the remaining examples of the table that pyridine, triphenylphosphine, piperidine, and triethylphosphite were totally ineffective as a catalyst modifier to produce the aldehyde product by the "oxo reaction."

The invention is further illustrated by the following examples:

*Example 1*

0.5 mole of cyclohexene is dissolved in 300 ml. of benzene with two grams of dicobalt octacarbonyl and 8 g. of triphenylphosphite and the solution placed in a high pressure autoclave. The autoclave is pressurized to 3600 p.s.i. with 1:1 carbon monoxide-hydrogen, respectively, and heated at 190° for 2 hours. After cooling, venting, and flushing the reactor, the contents are distilled to yield 67% cyclohexanecarboxaldehyde, with negligible alcohol present.

*Example 2*

One mole of propylene, 150 ml. benzene, 2 g. dicobalt octacarbonyl, and 12 g. triphenylphosphite are charged into a high pressure reaction and pressurized to 6000 p.s.i. with 1:4 carbon monoxide and hydrogen, respectively. The reactor is then heated at 140° for 2 hours. After working up the reaction products, a yield of aldehyde of 63% was obtained with substantially no by-products.

*Example 3*

0.5 mole of cyclohexene in 200 ml. of toluene was placed in the reactor with 2 g. dicobalt octacarbonyl and 6 g. of diphenyl phosphite. Carbon monoxide-hydrogen (2:1) was added at 4500 p.s.i. and the reactor was heated at 200° for 3 hours. The reaction product produced a 56% yield of aldehyde. No alcohol was obtained in the product of the reaction.

*Example 4*

0.5 mole of cyclohexene, 300 ml. benzene, 2 g. dicobalt octacarbonyl and 10 g. bis(triphenylphosphite)-chromium tetracarbonyl were charged into an autoclave and heated at 190° for 2 hours under 1:1 synthesis gas of carbon monoxide-hydrogen at 3800 p.s.i. A 66% yield of aldehyde was obtained with substantially no alcohol.

*Example 5*

One mole of pentene was placed in a reactor with 250 moles of benzene, and 5 g. dicobalt octacarbonyl added together with 6 g. tri(p-tolyl) phosphite. Carbon monoxide-hydrogen (1:2) was added at 2500 p.s.i. and the reactor heated at 225° for one hour. The yield of aldehyde was 48%. Negligible alcohol was obtained.

We claim:

1. In a process for producing an aldehyde in predominant proportions by hydroformylation of an olefinic compound, the improvement which comprises reacting said olefinic compound with carbon monoxide and hydrogen at a temperature in the range of about 110° to 350° C. and a pressure in the range of about 200 to 500 atmospheres in a liquid medium comprising a cobalt-carbonyl catalyst, an aromatic phosphite catalyst modifier selected from the group consisting of triphenyl phosphite, bis(p-tolyl)phenyl phosphite, diphenyl phosphite, trinaphthyl phosphite, tri(p-tolyl)phosphite and bis(triphenyl phosphite)chromium tetracarbonyl and a solvent which is inert with respect to the catalyst and the hydroformylation products, said carbonyl catalyst and phosphite catalyst modifier being employed in a molar ratio of about 1:2 to 1:10, respectively.

2. The process of claim 1 wherein the phosphite modifier is triphenylphosphite and the catalyst is dicobalt octacarbonyl.

3. The process of claim 1, wherein the molar ratio of phosphite modifier to cobalt carbonyl is about 4 to 1.

4. A process for preparing predominantly aldehydes by hydroformylation of an olefinic compound which comprises reacting an olefinic compound, carbon monoxide and hydrogen with a cobalt-carbonyl catalyst to which is added an aromatic phosphite compound selected from the group consisting of triphenyl phosphite, bis(p-tolyl)phenyl phosphite, diphenyl phosphite, trinaphthyl phosphite, tri(p-tolyl)phosphite and bis(triphenyl phosphite) chromium tetracarbonyl in a ratio of 2 to 10 moles of said phosphite compound per mole of catalyst, at a temperature in the range of about 110° to 350° C. and a pressure in the range of about 200 to 500 atmospheres and recovering the reaction product which is comprised essentially of the aldehyde.

5. In a process for producing an aldehyde by hydroformylation of an olefinic compound, the improvement which comprises reacting said olefinic compound with carbon monoxide and hydrogen at a temperature within the range of 110° to 225° C. and a pressure in the range of about 200 to 500 atmospheres in the presence of a cobalt-carbonyl catalyst with from 2 to 10 moles per mole of catalyst of an aromatic phosphite compound selected from the group consisting of triphenyl phosphite, bis(p-tolyl)phenyl phosphite, diphenyl phosphite, trinaphthyl phosphite, tri(p-tolyl)phosphite and bis(triphenyl phosphite) chromium tetracarbonyl added thereto and an organic solvent which is inert with respect to the catalyst and the hydroformylation products, the reaction product obtained being substantially an aldehyde.

References Cited in the file of this patent

UNITED STATES PATENTS

| | | |
|---|---|---|
| 2,918,496 | Booth | Dec. 22, 1959 |
| 2,927,085 | Gordon et al. | Mar. 1, 1960 |
| 2,932,669 | Haubein | Apr. 12, 1960 |
| 2,939,844 | Ellinger | June 7, 1960 |

FOREIGN PATENTS

| | | |
|---|---|---|
| 614,010 | Great Britain | Dec. 8, 1948 |
| 638,754 | Great Britain | June 14, 1950 |

OTHER REFERENCES

Hieber et al.: Chemical Abstracts, vol. 52 (1958), pp. 20146–20147.